(12) United States Patent
Anand et al.

(10) Patent No.: US 9,036,579 B2
(45) Date of Patent: May 19, 2015

(54) APPARATUS AND METHOD FOR SCH INTERFERENCE CANCELLATION

(71) Applicant: QUALCOMM INCORPORATED, San Diego, CA (US)

(72) Inventors: Raghavendra Shyam Anand, Hyderabad (IN); Yegnesh Srinivasan, Hyderabad (IN); Deepti Mani, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 13/732,752

(22) Filed: Jan. 2, 2013

(65) Prior Publication Data

US 2014/0003362 A1 Jan. 2, 2014

Related U.S. Application Data

(60) Provisional application No. 61/666,480, filed on Jun. 29, 2012.

(51) Int. Cl.
*H04W 24/02* (2009.01)
*H04B 1/7107* (2011.01)

(52) U.S. Cl.
CPC ............ *H04W 24/02* (2013.01); *H04B 1/7107* (2013.01); *H04B 2201/709709* (2013.01); *H04B 2201/70722* (2013.01)

(58) Field of Classification Search
CPC ..................................................... H04W 24/02
USPC ................. 370/317, 329; 455/63.1, 114.2
See application file for complete search history.

(56) References Cited

U.S. PATENT DOCUMENTS 8,532,586 B2 * 9/2013 Lakkis et al. .................. 455/91
2011/0182329 A1 7/2011 Wehinger

FOREIGN PATENT DOCUMENTS

EP 1909520 A1 4/2008
WO 0152490 A1 7/2001

OTHER PUBLICATIONS

International Search Report and Written Opinion—PCT/US2013/048672—ISA/EPO—Sep. 19, 2013.

* cited by examiner

*Primary Examiner* — Dang Ton
*Assistant Examiner* — Kevin Lee
(74) *Attorney, Agent, or Firm* — Darren M. Simon

(57) ABSTRACT

Apparatus and methods for wireless communication in a wireless communication network include initiating a high speed downlink packet access (HSDPA) call to a user equipment (UE), applying a synchronization channel interference cancellation (SCHIC) algorithm to the HSDPA call, calculating synchronization channel (SCH) interference based on the application of the SCHICH algorithm to the HSDPA call, and eliminating the SCH interference from the HSDPA call.

30 Claims, 11 Drawing Sheets

APPARATUS AND METHOD FOR SCH INTERFERENCE CANCELLATION

CLAIM OF PRIORITY UNDER 35 U.S.C. §119

The present application for patent claims priority to U.S. Provisional Application No. 61/666,480 entitled "APPARATUS AND METHOD FOR SCH INTERFERENCE CANCELLATION" filed Jun. 29, 2012, and assigned to the assignee hereof and hereby expressly incorporated by reference herein.

BACKGROUND

1. Field

Aspects of the present disclosure relate generally to wireless communication systems, and more particularly, to an apparatus and method of removing synchronization channel (SCH) interference in a wireless communication system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. One such desired enhancement of the user experience relates to removing interference when a user equipment (UE) is communicating with the UMTS network.

Therefore, methods and apparatuses are needed for in a wireless communication system when the UE is communicating with the UMTS network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of removing synchronization channel (SCH) interference in a wireless communication system includes initiating a high speed downlink packet access (HSDPA) call to a UE, applying a synchronization channel interference cancellation (SCHIC) algorithm to the HSDPA call, calculating SCH interference based on the application of the SCHICH algorithm to the HSDPA call, and eliminating the SCH interference from the HSDPA call.

In another aspect, an apparatus for removing SCH interference in a wireless communication system includes at least one processor configured to initiate an HSDPA call to a UE, apply a SCHIC algorithm to the HSDPA call, calculate SCH interference based on the application of the SCHICH algorithm to the HSDPA call, and eliminate the SCH interference from the HSDPA call.

Additionally, in another aspect, an apparatus includes means for initiating an HSDPA call to a UE, means for applying a SCHIC algorithm to the HSDPA call, means for calculating SCH interference based on the application of the SCHICH algorithm to the HSDPA call, and means for eliminating the SCH interference from the HSDPA call.

Still further, in an aspect, a computer program product includes a computer-readable media that may include machine-executable code for initiating a HSDPA call to a UE, machine-executable code for applying a SCHIC algorithm to the HSDPA call, machine-executable code for calculating SCH interference based on the application of the SCHICH algorithm to the HSDPA call, and machine-executable code for eliminating the SCH interference from the HSDPA call.

These and other aspects of the disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As indicated above, a desired enhancement of the user experience is to remove interference in a wireless communication system when a user equipment (UE) is communicating with the Universal Mobile Telecommunications System (UMTS) network.

Generally, a Wideband-Code Division Multiple Access (W-CDMA) downlink transmits a synchronization channel (SCH) to a UE to synchronize with a Node B. However, the SCH is neither spread using an orthogonal variable spreading factor (OVSF) code nor scrambled. Consequently, a Primary SCH and a Secondary SCH are orthogonal to each other and cause interference to other codes (covered by a scrambling code). Further, WCDMA standards require Node Bs to transmit the SCH only in the first 256 chips of every slot (2560 chips). Since the SCH is expected to be available to all UEs, the Node Bs transmit the SCH at almost the same power level as a Common Pilot Channel (CPICH), which is transmitted at a highest power from a Node B. Typically, the CPICH is at −10 dB and the SCH is also at −10 dB.

Moreover, High-Speed Downlink Packet Access (HSDPA) occupies 15 codes at a spreading factor (SF) of 16 symbols and for first 16 symbols of HSDPA, interference from the SCH is present. The UE uses various synchronization channel interference cancellation (SCHIC) techniques to limit the impact of SCH interference on UE performance. Since most of the techniques are estimation-based techniques, the noise and the signal-to-noise ratio (SNR) of first 16 high speed physical downlink shared channel (HSPDSCH) symbols in a slot is less than an SNR of the remaining symbols and may be able to be eliminated.

Thus, apparatuses and methods are provided for removing the SCH interference in a wireless communication system when the UE is communicating with the UMTS network.

Figure 1:
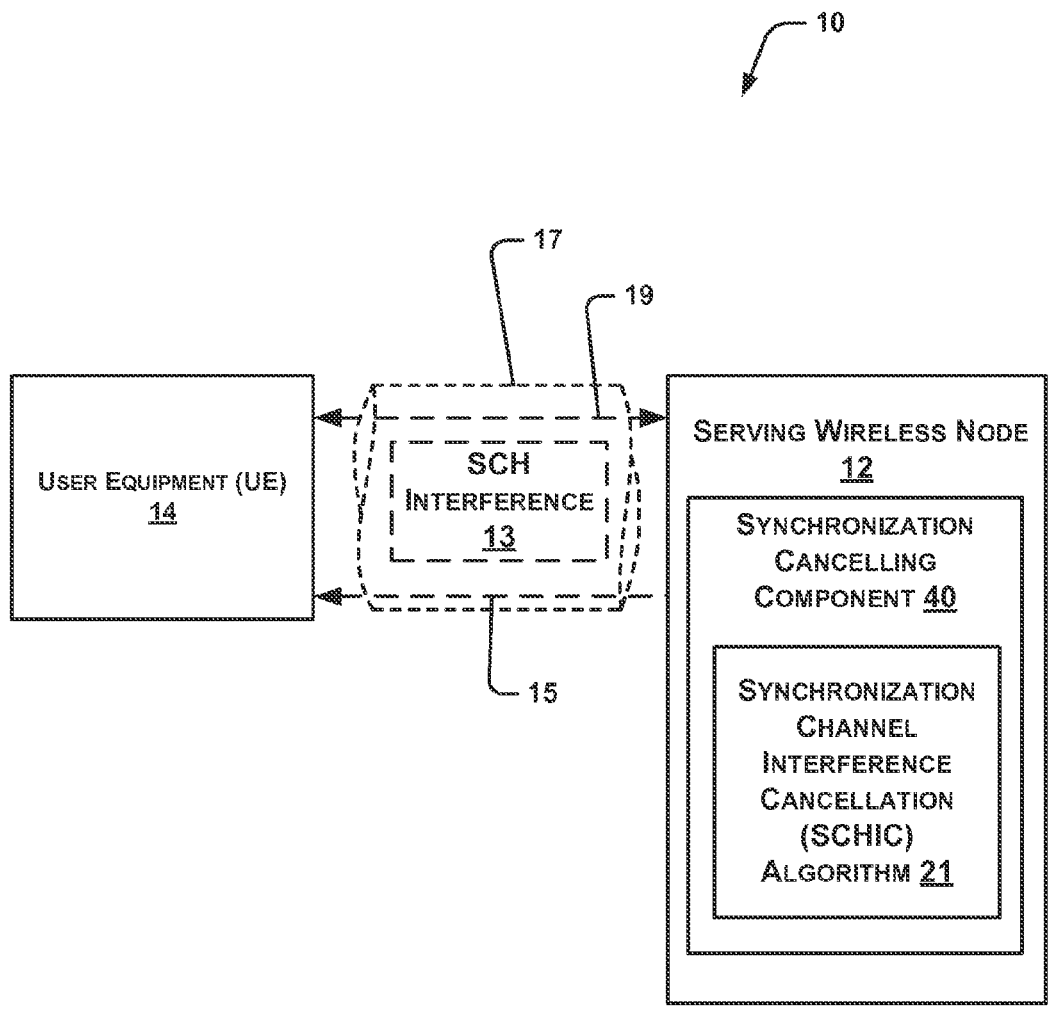
FIG. 1 is a schematic diagram illustrating an example wireless communication system including an aspect of a synchronization cancelling component as described herein.

Referring to FIG. 1, a wireless communication system 10 includes a wireless node, such as serving wireless node 12, having a synchronization cancelling component 40 configured to remove SCH interference 13 from a transmitted SCH 15 for a particular UE 14, thereby increasing the throughput to UE 14. UE 14 may communicate wirelessly with one or more wireless nodes, including, but not limited to, serving wireless node 12, via one or more links 17, which may include, but are not limited to, serving channels (e.g. data channels, etc.) and/or non-serving channels (e.g. pilot channels or beacon, etc.). In an example, serving wireless node 12 may be configured to initiate a HSDPA call 19 to UE 14. Further, serving wireless node 12 may execute synchronization cancelling component 40 to apply a synchronization channel interference cancellation (SCHIC) algorithm 21 to HSDPA call 19. For instance, SCHIC algorithm 21 may operate to calculate SCH interference 13 with respect to HSDPA call 19, and thereafter eliminate the SCH interference 13 from HSDPA call 19. Thus, serving wireless node 12 and synchronization cancelling component 40 account for the presence of SCH interference 13 and apply an algorithm to reduce or eliminate SCH interference 13 to improve performance of UE 14 with respect to HSDPA call 19.

Further, as used herein, UE 14 may comprise a mobile apparatus and may be referred to as such throughout the present disclosure. Such a mobile apparatus or UE may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, as used herein, the one or more wireless nodes, including, but not limited to, serving wireless node 12 of system 10 may include one or more of any type of network component, such as an access point, including a base station (BS) or node B, a relay, a peer-to-peer device, an authentication, authorization and accounting (AAA) server, a mobile switching center (MSC), a radio network controller (RNC), etc. In a further aspect, the one or more wireless nodes of system 10 may include one or more small base stations, such as, but not limited to a femtocell, picocell, microcell, or any other small base station.

Figure 2:
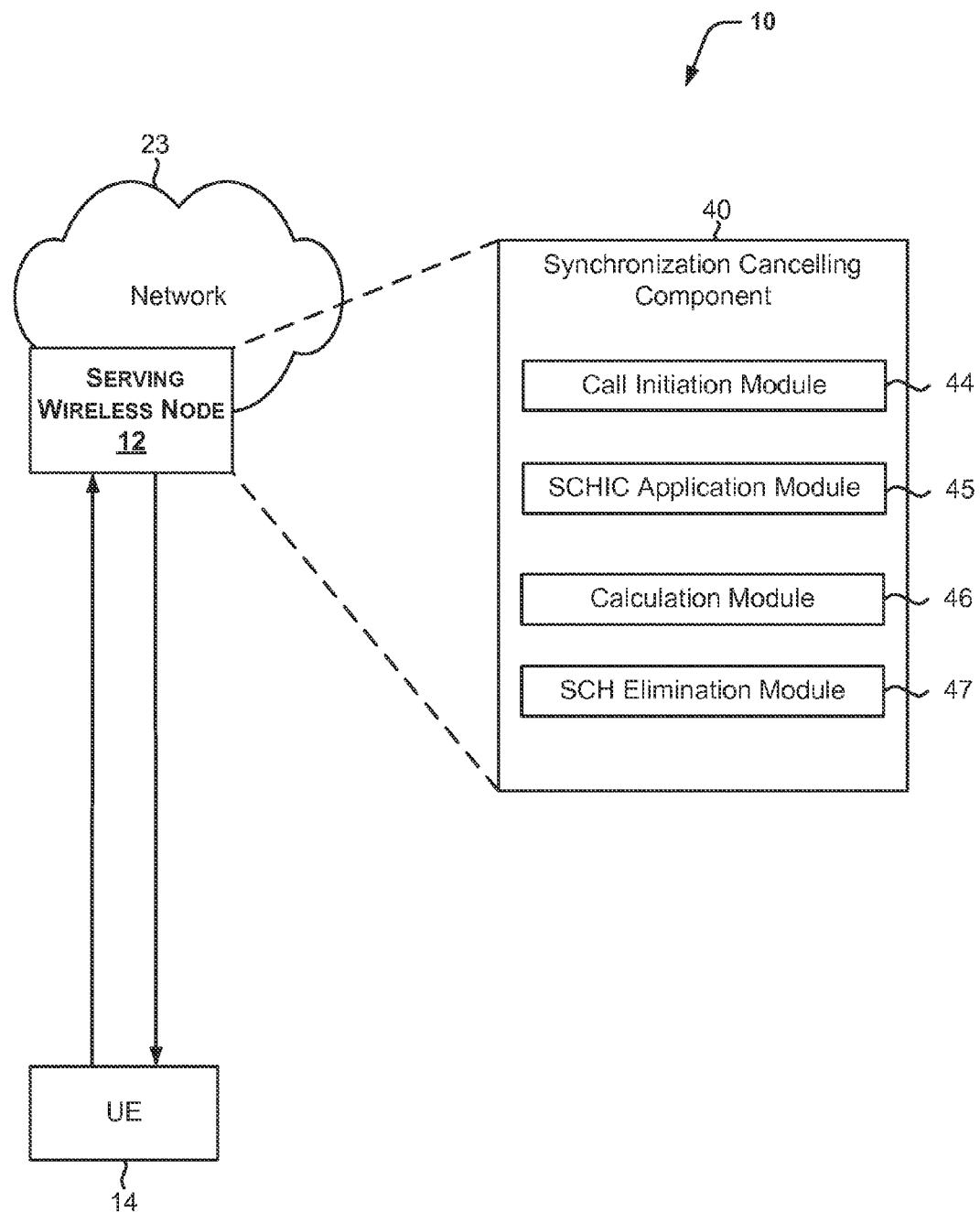
FIG. 2 is a schematic diagram similar to FIG. 1, but including additional aspects of the synchronization cancelling component.

FIG. 2 discloses another aspect of wireless communication system 10 including a more detailed aspect of the components of synchronization cancelling component 40. The wireless communications system 10 may be configured to support communications between a number of users. FIG. 2 illustrates a manner in which serving wireless node 12 communicates with UE 14, e.g. via network 23. The wireless communication system 10 can be configured for downlink message transmission or uplink message transmission, as represented by the up/down arrows between serving wireless node 12 and UE 14.

In an aspect, synchronization cancelling component 40 resides within serving wireless node 12. The synchronization cancelling component 40 may be configured, among other things, to include a call initiation module 44 capable of initiating HSDPA call 19 (FIG. 1) to UE 14. The synchronization cancelling component 40 may also be configured to include an SCHIC application module 45 configured to apply SCHIC algorithm 21 (FIG. 1) to the HSDPA call 19 (FIG. 1).

Still further the synchronization cancelling component 40 tray be configured to include a calculation module 46 capable of calculating SCH interference 13 (FIG. 1) based on the application of the SCHIC algorithm 21 to the HSDPA call 19. Finally, the synchronization cancelling component 40 may include a SCH elimination module 46 to eliminate SCH interference 13 from the HSDPA call 19. Note that the SCHIC algorithm 21 limits the impact of SCH interference 13 on UE 14 performance and throughput. In an aspect, the SCHIC algorithm 21 may be defined as follows:

$p(n) = C_{psc}(n)$ $s(n) = C_{ssc,k}(n)$, where k is index of SSC present in this slot $c(n) =$ OVSF code for HSDPA channel $z(n) = n^{th}$ chip of scrambling code corresponding to this slot $\alpha =$ pilot symbol amplitude $\beta =$ PSCH amplitude $\gamma =$ SSCH amplitude $n =$ time index for this slot $b(k) =$ HSPDSCH symbols on code $c(n)$, in this slot, $0 \le k \le 159$.

Note that at Node B, SCH interference 13 caused by the SCH 15 for the first 16 HSPDSCH symbols on a code is:

$\hat{a}(k) = \sum_{n=k*16}^{(k+1)*16-1}[\beta*p(n)+\gamma*s(n)]*conj(\alpha*z(n)*c(n))$, $0 \le k \le 15$ $\hat{a}(k) = 0$, for $16 \le k \le 159$ Afterwards, the following signal for a particular HSPDSCH channel is transmitted:

$\lambda(n)=[b(k)-\hat{a}(k)]*c(n)$, for $16 \, k \leq n \leq (16(k+1)-1)$ and $0 \leq k \leq 159$ The SCH interference 13 caused by the SCM 15 for the first 16 HSPDSCH symbols on a code is determined by multiplying the primary synchronization channel (PSCH) amplitude with the primary synchronization code (PSC) and adding the result to the secondary synchronization channel (SSCH) amplitude multiplied with the secondary synchronization code (SSC). Afterwards, the results of this previous calculation is multiplied with the conjugate of the received pilot symbol times the $n^{th}$ chip of the scrambling code corresponding to the current slot position and the OVSF code of the HSDPA channel. This is then summed over the first 16 HSPDSCH symbols to determine the SCH interference 13 caused by the SCH 15 for the first 16 HSPDSCH symbols on a code.

Indeed, a conventional Node B transmits HSPDSCH channels without accounting for the presence of SCH interference 13. Aspects of this apparatus and method allows for the serving wireless node 12 to apply SCHIC algorithm 21 to reduce the SCH interference 13. As such, the Node B, e.g. serving wireless node 12 as discussed herein, can completely remove the SCH interference 13 for a particular UE 14 and increase the throughput. Indeed, the SCH interference 13 of the HSDPA call 19 for the first 16 HSPDSCH symbols may eliminated by applying the SCHIC algorithm 21.

Thus, the present apparatus and methods include a wireless node-based synchronization cancelling component configured to remove synchronization channel interference such that the throughput of an HSDPA call with a UE increases.

Figure 3:
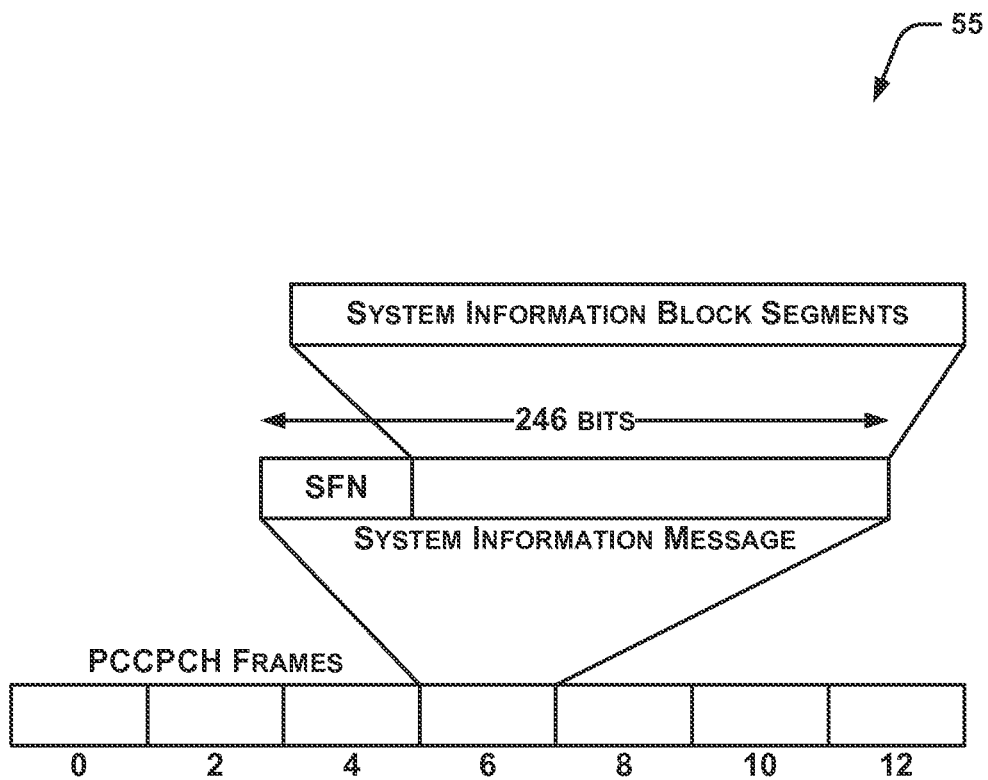
FIG. 3 is schematic diagram illustrating structure of a system information message.

FIG. 3 is schematic diagram illustrating structure 55 of a broadcast of a system information message. Specifically, structure 55 includes a system information message broadcast on a Primary Common Control Physical Channel (PCCPCH). Generally, every 20 ms, a system information message is broadcast on the PCCPCH. This message encapsulates and segments the Master information Block (MIB), Scheduling Blocks (SB), and the System Information Blocks (SIB). Note that, in an aspect, the MIB is sent every 80 ms.

As such, the MIB has a value tag which gets incremented every time content of any SIB changes. The MIB also has scheduling info for SBs and SIBs. SIBs contain access stratum and non-access stratum information elements like UE timer values, reselection parameters, power offsets. etc. The SIB may also include information pertaining to the SCH signal.

Therefore, the UE 14 can know about changes in contents on the PCCPCH through the value tag. When the UE 14 reads the SIB for the first time, the UE 14 stores the value tag for that SIB. After that, each time the UE 14 reads the MIB, the UE 14 compares the transmitted value tags with the stored value tags for each SIB. If any value tag has changed, the UE 14 may re-read the corresponding SIB and update its stored values.

Consequently, in one aspect, UTRAN notifies the UE 14 that system information has changed using the Paging Type 1 message on PCH and the System Information Change Indication message on EACH.

In another aspect, SIB Type 7 uses a timer for change control. Each time the UE 14 reads SIB7, it starts an expiration timer. When the timer expires, the UE 14 is triggered to re-read that SIB. In an aspect, a typical value of the expiration timer is 640 ms.

Additionally, since the SIB may include information pertaining to the SCH signal, the UE 14 may be configured to read SCH signal information residing in the SIB for eliminating SCH interference from the HSDPA call Thus, the structure 55 of FIG. 3 may be configured for use by the synchronization cancelling component 40 (FIG. 2) as described herein.

Figure 4:
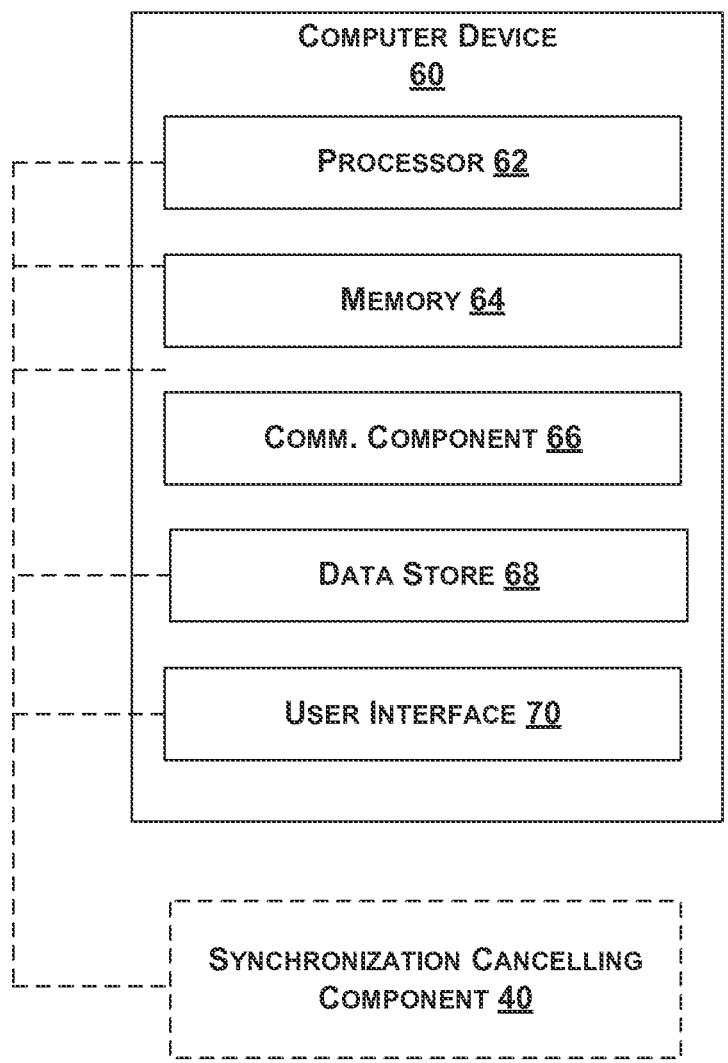
FIG. 4 is a schematic diagram illustrating example components of a computer device according to the present disclosure.

Referring to FIG. 4, in one aspect, serving wireless node 12 of FIGS. 1 and/or 2 may be represented by a specially programmed or configured computer device 60. For example, for implementation as serving wireless node 12 (FIGS. 1 and 2), computer device 60 may include one or more components for cancelling SCH interference from an HSDPA call, such as in specially programmed computer readable instructions or code, firmware, hardware, or some combination thereof. In an aspect, computer device 60 includes a processor 62 for carrying out processing functions associated with one or more of components and functions described herein. Processor 62 can include a single or multiple set of processors or multi-core processors. Moreover, processor 62 can be implemented as an integrated processing system and/or a distributed processing system.

Computer device 60 further includes a memory 64, such as for storing data used herein and/or local versions of applications being executed by processor 62. Memory 64 can include any type of memory usable by a computer, such as random access memory (RAM), read only memory (ROM), tapes, magnetic discs, optical discs, volatile memory, non-volatile memory, and any combination thereof.

Further, computer device 60 includes a communications component 66 that provides for establishing and maintaining communications with one or more parties utilizing hardware, software, and services as described herein. Communications component 66 may carry communications between components on computer device 60, as well as between computer device 60 and external devices, such as devices located across a communications network and/or devices serially or locally connected to computer device 60. For example, communications component 66 may include one or more buses, and may further include transmit chain components and receive chain components associated with a transmitter and receiver, respectively, or a transceiver, operable for interfacing with external devices. In an additional aspect, communications component 66 may be configured to receive one or more pages from one or more subscriber networks.

Additionally, computer device 60 may further include a data store 68, which can be any suitable combination of hardware and/or software, that provides for mass storage of information, databases, and programs employed in connection with aspects described herein. For example, data store 68 may be a data repository for applications not currently being executed by processor 62 and/or any threshold values or finger position values, Computer device 60 may additionally include a user interface component 70 operable to receive inputs from a user of computer device 60, and further operable to generate outputs for presentation to the user. User interface component 70 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 70 may include one or more output devices, including but not limited to a display, a speaker, a haptic feedback mechanism, a printer, any other mechanism capable of presenting an output to a user, or any combination thereof.

Furthermore, the computer device 60 may include, or may be in communication with, a synchronization cancelling component 40, which may be configured to perform the functions described in reference to FIGS. 1 and 2 with regard to such a component.

Figure 5:
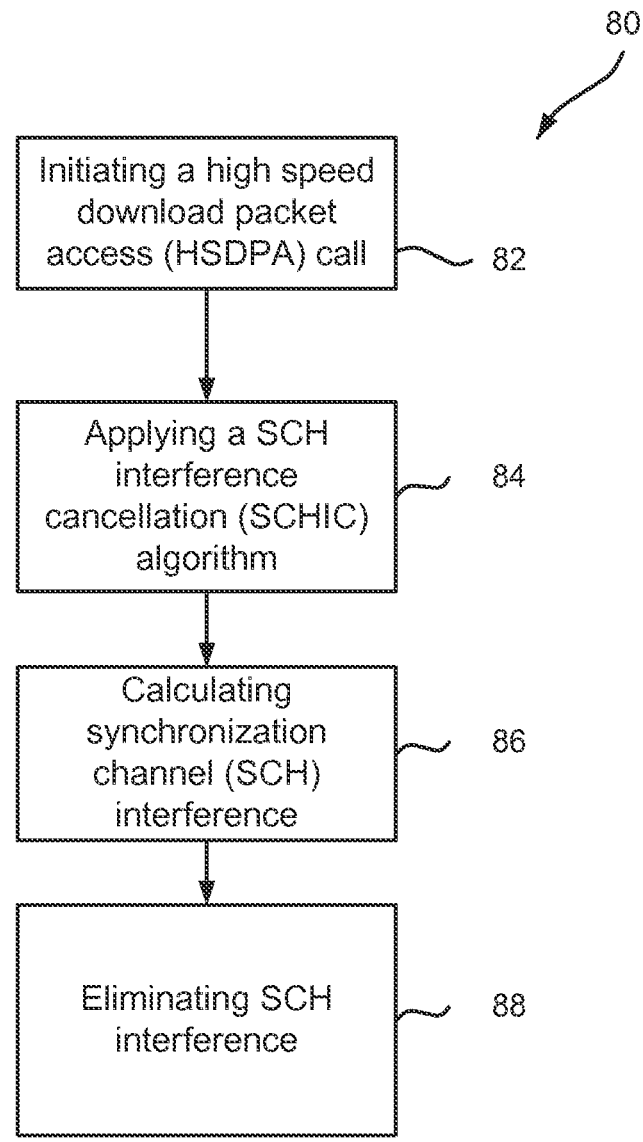
FIG. 5 is a flow diagram illustrating an exemplary method of removing synchronization interference in a wireless communication system.

FIG. 5 is a flow diagram illustrating an exemplary method 80 of removing synchronization interference in a wireless communication system. Initiating a HSDPA call to a UE occurs at 82. For example, in an aspect, serving wireless node 12 (FIGS. 1 and 2) may be configured to initiate a HSDPA call 19 via the call initiation module 44.

At 84, serving wireless node 12 applies a SCHIC algorithm to the HSDPA call. For example, in an aspect, serving wireless node 12 (FIGS. 1 and 2) may be configured to apply a SCHIC algorithm 21 to the HSDPA call 19 via the SCHICH application module 45.

Calculating SCH interference based on the application of the SCHCH algorithm to the HSDPA call occurs at 86. For example, serving wireless node 12 (FIGS. 1 and 2) may be configured to calculate SCH interference 13 based on the application of the SCHICH algorithm 21 to the HSDPA call 19 via calculation module 46.

Last, at 87, elimination of SCH interference from the HSDPA call occurs. For example, serving wireless node 12 (FIGS. 1 and 2) eliminates SCH interference 13 from the HSDPA call 19 via SCH elimination module 47.

In an aspect, for example, a network component executing method 80 may be serving wireless node 12 (FIG. 2) executing synchronization cancelling component 40 (FIG. 2), or respective components thereof.

Figure 6:
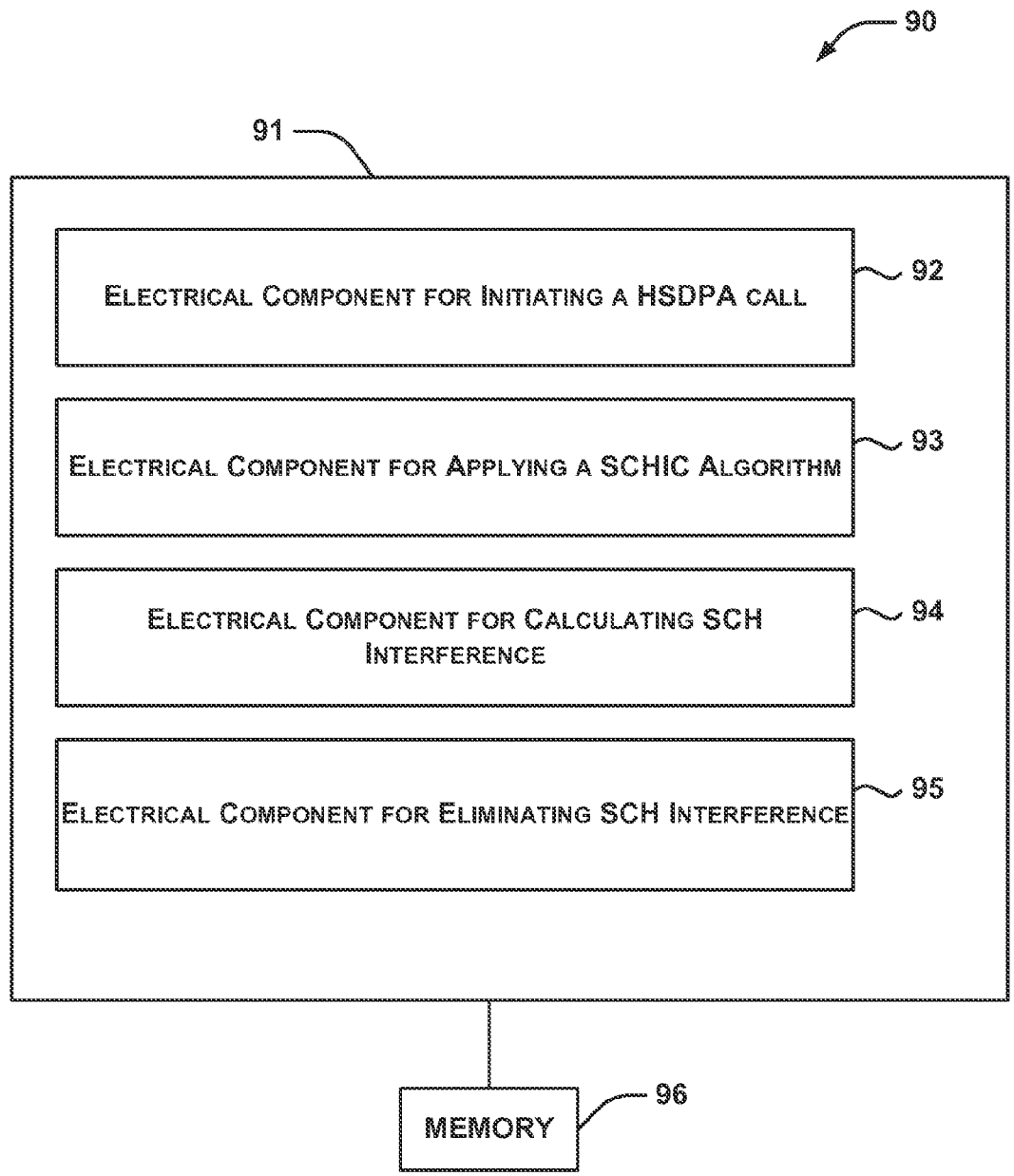
FIG. 6 is a schematic diagram illustrating aspects of a logical grouping of electrical components as contemplated by the present disclosure.

Referring to FIG. 6, an example system 90 is displayed for improved and simplified channel condition feedback to a serving wireless node. For example, system 90 can reside at least partially within serving wireless node 12 of FIG. 2. It is to be appreciated that system 90 is represented as including functional blocks, which can be functional blocks that represent functions implemented by a processor, software, or combination thereof (e.g., firmware). For example, system 90 may be implemented via processor 62, memory 64 communications component 66 and data store 68 of FIG. 4, or for example by processor 64 executing software stored by memory 64 and/or data store 68.

Example system 90 includes a logical grouping 91 of electrical components that can act in conjunction. For instance, logical grouping 91 can include an electrical component 92 for initiating a HSDPA call. In an aspect, electrical component 92 may comprise initiating a HSDPA call via the call initiation module 44 (FIG. 2).

Additionally, logical grouping 91 can include an optional electrical component 93 for applying a SCHIC algorithm. In an aspect, electrical component 93 may comprise applying a SCHIC algorithm to the HSDPA call via the SCHICH application module 45 (FIG. 2).

In an additional aspect, logical grouping 91 can include an electrical component 94 for calculating SCH interference. In an aspect, electrical component 94 may comprise calculating SCH interference based on the application of the SCHICH algorithm to the HSDPA call via calculation module 46 (FIG. 2).

Last, logical grouping 91 can include an electrical component 95 for eliminating SCH interference. In an aspect, electrical component 95 may comprise eliminating SCH interference from the HSDPA call via SCH elimination module 47 (FIG. 2).

Electrical components 92, 93, 94, and 95 may correspond to one or more components in FIG. 2, and such components may be separate physical components, components implemented by processor 62 (FIG. 4), or a combination thereof.

Additionally, system 90 can include a memory 96 that retains instructions for executing functions associated with the electrical 92, 93, 94, and 95, stores data used or obtained by the electrical components 92, 93, 94, and 95, etc. While shown as being external to memory 96, it is to be understood that one or more of the electrical components 92, 93, 94, and 95 can exist within memory 96. In one example, electrical components 92, 93, 94, and 95 can comprise at least one processor, or each electrical component 92, 93, 94, and 95 can be a corresponding module of at least one processor. Moreover, in an additional or alternative example, electrical components 92, 93, 94, and 95 can be a computer program product including a computer readable medium, where each electrical component 92, 93, 94, and 95 can be corresponding code.

Figure 7:
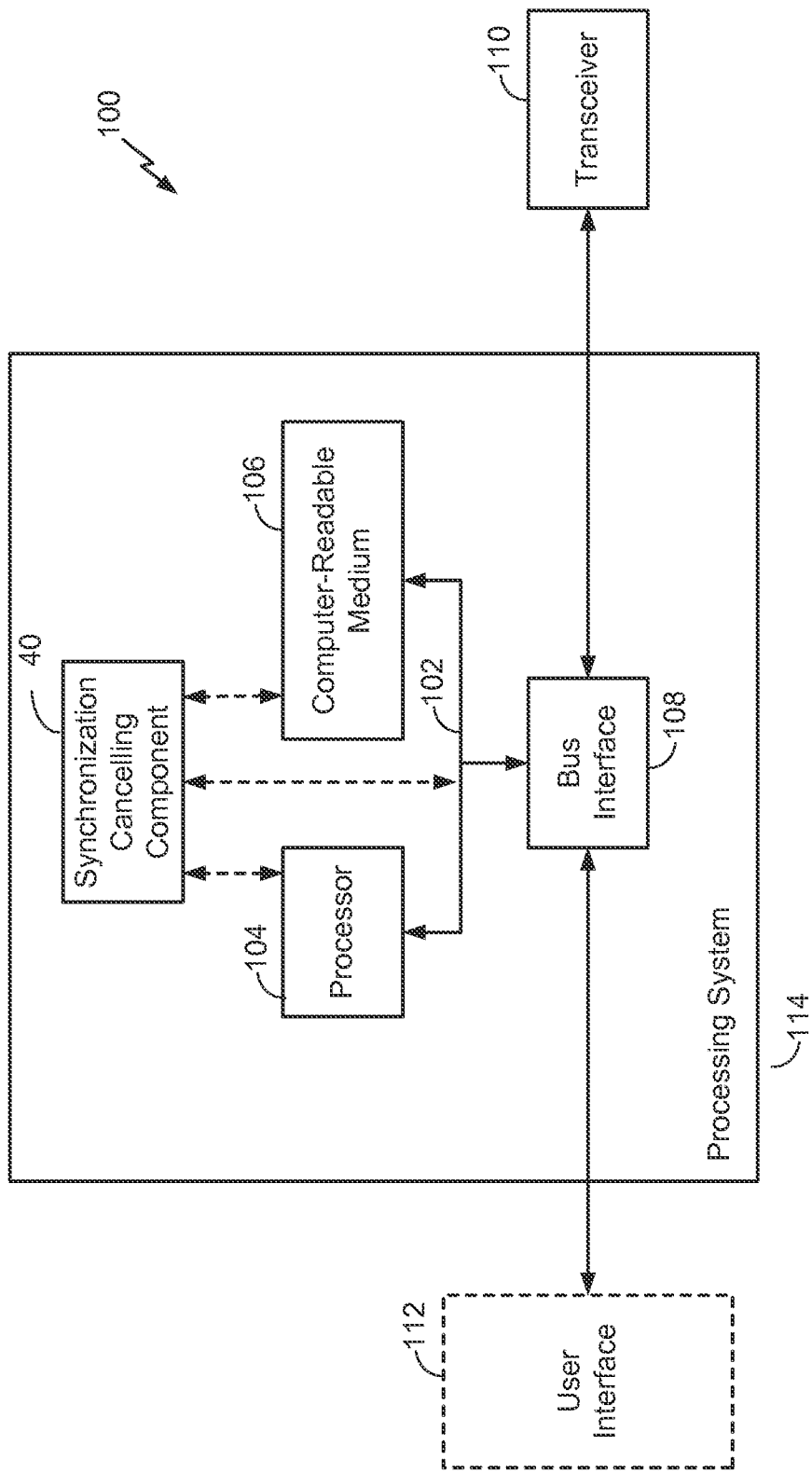
FIG. 7 is a schematic diagram illustrating an example of a hardware implementation for an apparatus employing a processing system to perform the functions described herein.

FIG. 7 is a block diagram illustrating an example of a hardware implementation for an apparatus 100 employing a processing system 114 for carrying out improved channel quality feedback, such as for implementing pilot estimating component 40 (FIG. 2). In this example, the processing system 114 may be implemented with a bus architecture, represented generally by a bus 102. The bus 102 may include any number of interconnecting buses and bridges depending on the specific application of the processing system 114 and the overall design constraints. The bus 102 links together various circuits including one or more processors, represented generally by the processor 104, computer-readable media, represented generally by the volatile or/or non-volatile computer-readable storage medium 106, and one or more components described herein, such as, but not limited to, the pilot estimating component 40 (FIG. 2). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 702 and general processing, including the execution of software stored on the computer-readable storage medium 106. The software, when executed by the processor 104, causes the processing system 114 to perform the various functions described infra for any particular apparatus. The computer-readable storage medium 106 may also be used for storing data that is manipulated by the processor 104 when executing software. Note that each and every element/component module/means of FIGS. 1-5 may be implemented by processor 104 and computer-readable medium 106, which causes the processing system 114 to perform the various functions/processes/algorithms described in FIGS. 1-5.

Thus, call processing component 30/40 may be a separate physical component, or a component implemented by processor 104 or stored in computer-readable storage medium 106, or a combination thereof.

Figure 8:
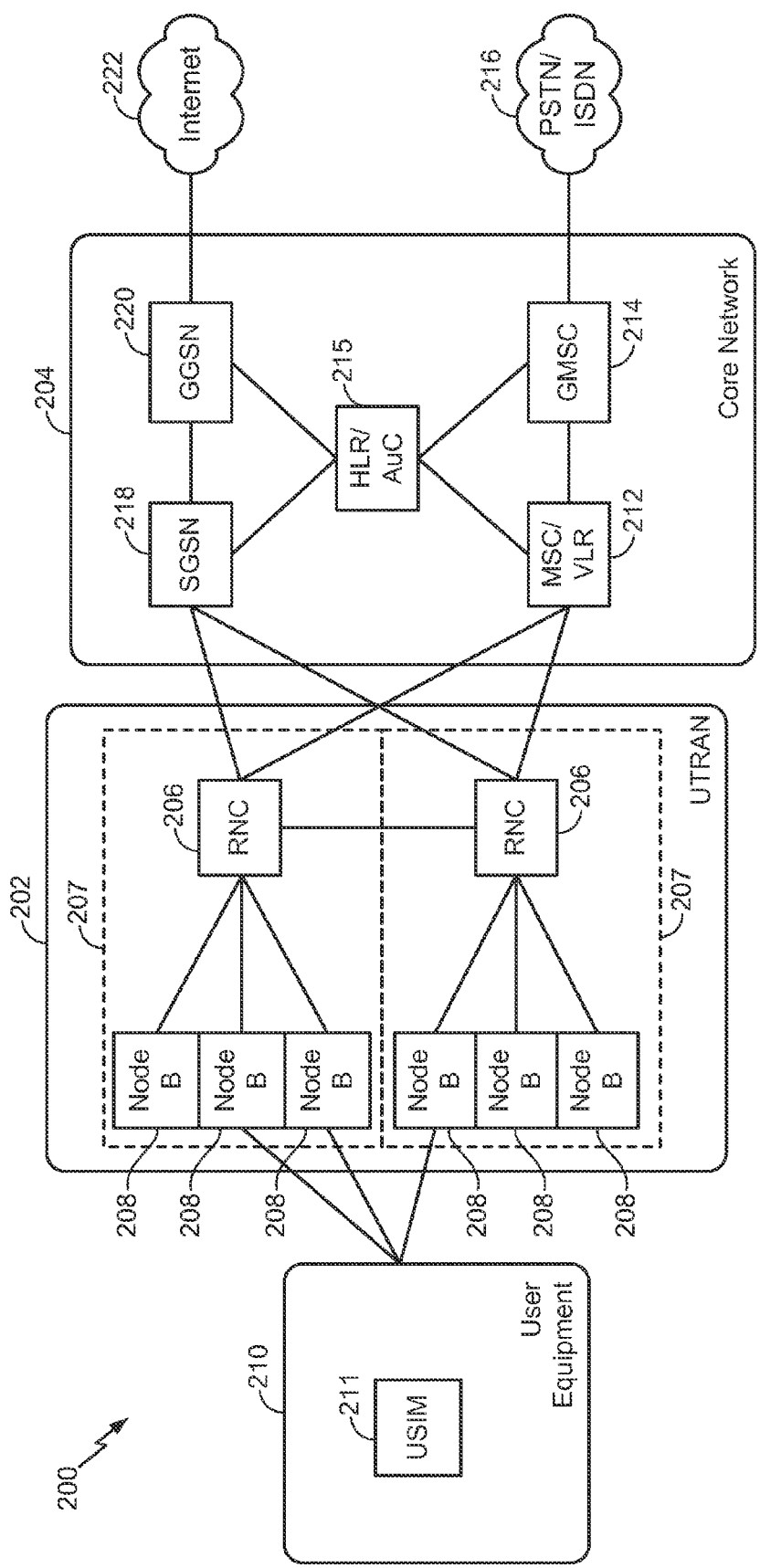
FIG. 8 is a schematic diagram conceptually illustrating an example of a telecommunications system including a Node B configured to perform the functions described herein.

Referring to FIG. 8, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. Node B 208 and/or UE 210, which may respectively be the same as or similar to serving wireless node 12 and UE 14 of FIG. 1, may be configured to include, for example, the synchronization cancelling component 40 (FIG. 2) as described above. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PRY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of UEs 210. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 210 may be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the channel quality indicator (CQI) and protocol control information (PCI). "HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate, or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 9:
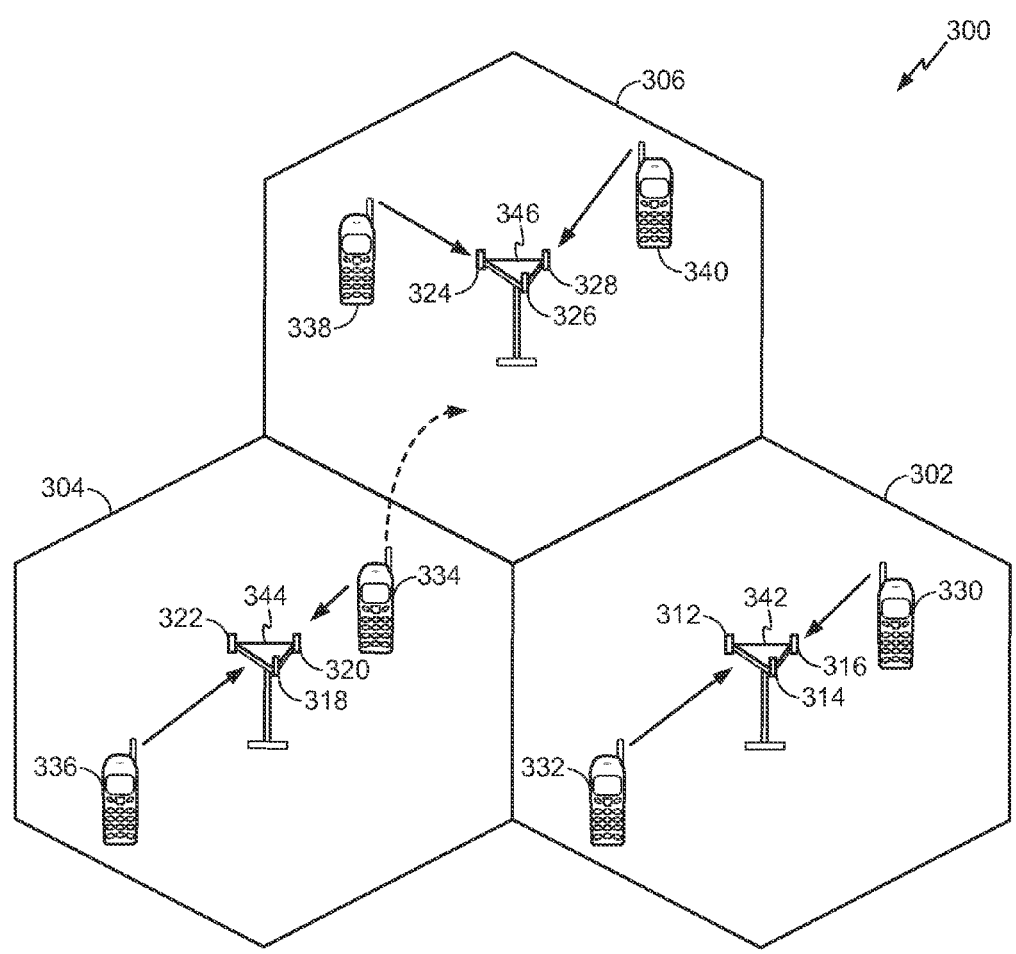
FIG. 9 is a schematic diagram illustrating an example of an access network including a Node B configured to perform the functions described herein.

Referring to FIG. 9, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 8) for all the UEs 330, 332, 334, 336, 338, 340 in the respective cells 302, 304, and 306. Node Bs 342, 344, 346 and UEs 330, 332, 334, 336, 338, 340, respectively represented as network 12 and UE 14 of FIG. 2, may be configured to include, for example, the synchronization cancelling component 40 (FIG. 2) as described above.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (FIG. 8), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 10.

Figure 10:
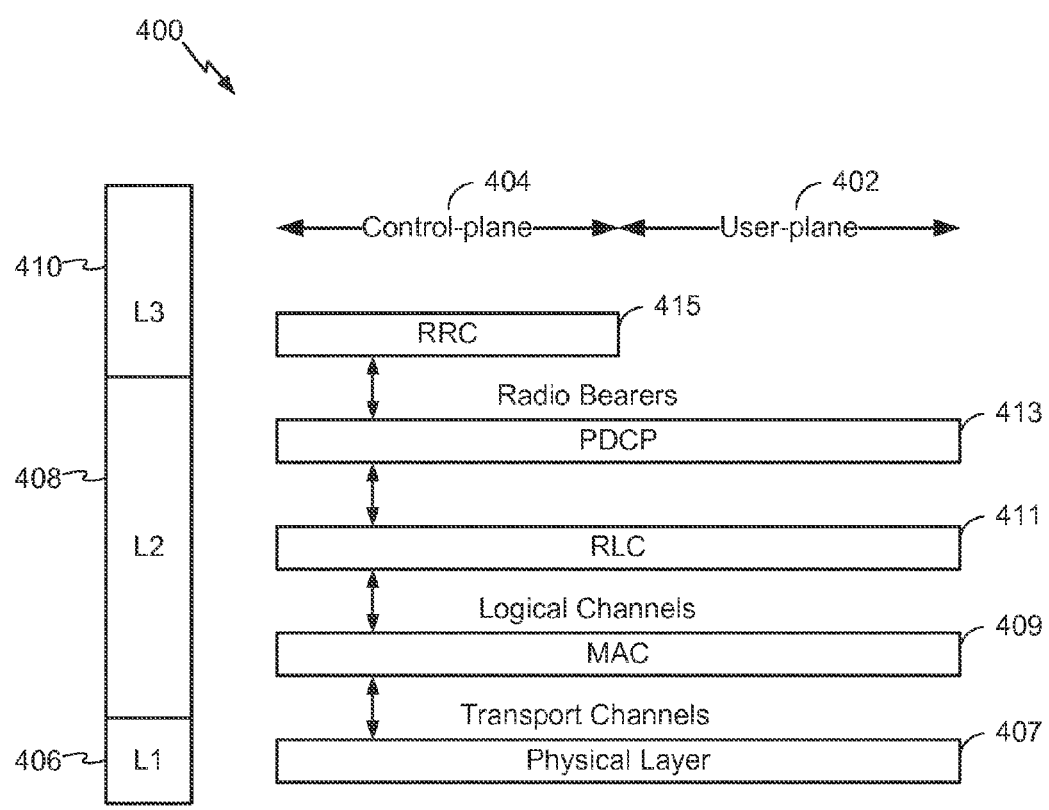
FIG. 10 is a schematic diagram illustrating an example of a radio protocol architecture for the user and control planes for a base station and/or a UE configured to perform the functions described herein.

FIG. 10 is a conceptual diagram illustrating an example of the radio protocol architecture 400 for the user plane 402 and the control plane 404 of a user equipment (UE) or node B/base station. For example, architecture 400 may be included in a network entity and/or UE such as an entity within serving wireless node 12 and/or UE 14 (FIGS. 1 and 2). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UR and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 11:
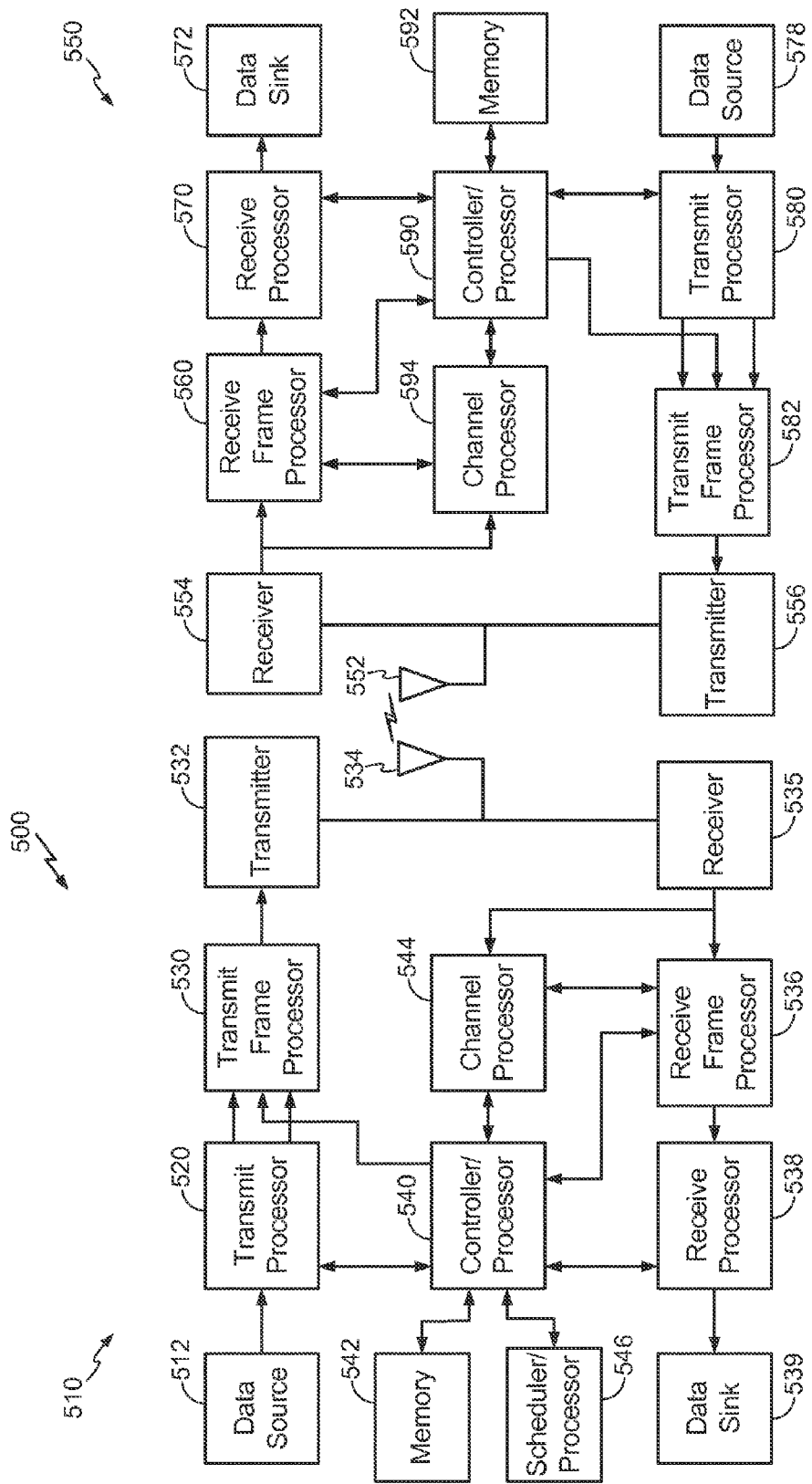
FIG. 11 is a schematic diagram conceptually illustrating an example of a Node B in communication with a UE in a telecommunications system, where the Node B may be configured to perform the functions described herein.

FIG. 11 is a block diagram of a communication system 500 including a Node B 510 in communication with a UE 550, where Node B 510 may be serving wireless node 12 and the LIE 550 may be UE 14 according to the aspect described in FIG. 1. In the downlink communication, a transmit processor 520 may receive data from a data source 512 and control signals from a controller/processor 540. The transmit processor 520 provides various signal processing functions for the data and control signals, as well as reference signals pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes). CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
initiating, from a serving wireless node, a high speed downlink packet access (HSDPA) call to a user equipment (UE);
applying, at the serving wireless node, a synchronization channel interference cancellation (SCHIC) algorithm to the HSDPA call;
calculating synchronization channel (SCH) interference based on the application of the SCHIC algorithm to the HSDPA call; and
eliminating, by the serving wireless node the SCH interference from the HSDPA call based at least in part on transmitting a signal for a particular high speed physical downlink shared channel (HSPDSCH) with the SCH interference removed from the signal to the UE.

2. The method of claim 1, wherein the eliminating of the SCH interference comprises eliminating on a first 16 HSPDSCH symbols.

3. The method of claim 1, wherein the calculating the SCH interference is based at least in part on adding a primary synchronization channel amplitude multiplied with a primary synchronization code to a secondary synchronization channel amplitude multiplied with a secondary synchronization code.

4. The method of claim 1, wherein a SCH signal related to the SCH interference is included in a system information block (SIB) received at the UE.

5. The method of claim 4, wherein a master information block comprises scheduling information for the SIB.

6. The method of claim 4, wherein the SIB comprises access stratum and non-access stratum information elements including at least one of a UE timer value, a reselection parameter, and a power offset.

7. The method of claim 1, further comprising summing the SCHIC algorithm over a first 16 HSPDSCH symbols.

8. The method of claim 7, wherein the calculating the SCH interference further comprises determining the SCH interference for the first 16 HSPDSCH symbols in the HSDPA call.

9. The method of claim 3, wherein the calculating the SCH interference is further based at least in part on multiplying a result of the adding with a conjugate of received pilot symbol times in a chip of a scrambling code corresponding to a slot position and an orthogonal variable spreading factor (OVSF) code of the HSDPA call.

10. An apparatus for wireless communication in a wireless communication network, comprising:
means for initiating, from a serving wireless node, a high speed downlink packet access (HSDPA) call to a user equipment (UE);
means for applying, the serving wireless node, a synchronization channel interference cancellation (SCHIC) algorithm to the HSDPA call;
means for calculating synchronization channel (SCH) interference based on the application of the SCHIC algorithm to the HSDPA call; and
means for eliminating, by the serving wireless node, the SCH interference from the HSDPA call based at least in part on transmitting a signal for a particular high speed physical downlink shared channel (HSPDSCH) with the SCH interference removed from the signal to the UE.

11. The apparatus of claim 10, wherein the means for eliminating the SCH interference further comprises means for eliminating on a first 16 HSPDSCH symbols.

12. The apparatus of claim 10, wherein of the means for calculating further comprises means for calculating the SCH interference based at east in part on adding a primary synchronization channel amplitude multiplied with a primary synchronization code to a secondary synchronization channel amplitude multiplied with a secondary synchronization code.

13. The apparatus of claim 12, wherein the means for calculating further comprises means for calculating the SCH interference further based at least in part on multiplying a result of the adding with a conjugate of received pilot symbol times in a chip of a scrambling code corresponding to a slot position and an orthogonal variable spreading factor (OVSF) code of the HSDPA call.

14. The apparatus of claim 10, wherein the means for applying the SCHIC algorithm further comprises means for summing the SCHIC algorithm over a first 16 HSPDSCH symbols.

15. The apparatus of claim 14, wherein the means for calculating the SCH interference further comprises means for determining the SCH interference for the first 16 HSPDSCH symbols in the HSDPA call.

16. A
non-transitory computer readable medium comprising machine executable code for:
initiating, from a serving wireless node, a high speed downlink packet access (HSDPA) call to a user equipment (UE);
applying, at the serving wireless node, a synchronization channel interference cancellation (SCHIC) algorithm to the HSDPA call;
calculating synchronization channel (SCH) interference based on the application of the SCHIC algorithm to the HSDPA call; and
eliminating, by the serving wireless node, the SCH interference from the HSDPA call based at least in art on transmitting a signal for a articular high speed physical downlink shared channel (HSPDSCH) with the SCH interference removed from the signal to the UE.

17. The computer readable medium of claim 16, wherein the SCH interference occurs on a first 16 HSPDSCH symbols.

18. The computer readable medium of claim 16, wherein the code for calculating further comprises code for calculating the SCH interference based at least in part on adding a primary synchronization channel amplitude multiplied with a primary synchronization code to a secondary synchronization channel amplitude multiplied with a secondary synchronization code.

19. The computer readable medium of claim 18, wherein the code for calculating further comprises code for calculating the SCH interference further based at least in part on multiplying a result of the adding with a conjugate of received pilot symbol times in a chip of a scrambling code corresponding to a slot position and an orthogonal variable spreading factor (OVSF) code of the HSDPA call.

20. The computer readable medium of claim 16, wherein the code for applying the SCHIC algorithm further comprises code for summing the SCHIC algorithm over a first 16 HSPDSCH symbols.

21. The computer readable medium of claim 20, wherein the code for calculating the SCH interference further comprises code for determining the SCH interference for the first 16 HSPDSCH symbols in the HSDPA call.

22. An apparatus for wireless communication in a wireless communication network, comprising:
at least one processor; and
a memory coupled to the at least one processor,
wherein the at least one processor is configured to:
initiate, from a serving wireless node, a high speed downlink packet access (HSDPA) call to a user equipment (UE);

apply, at the serving wireless node, a synchronization channel interference cancellation (SCHIC) algorithm to the HSDPA call;

calculate synchronization channel (SCH) interference based on the application of the SCHIC algorithm to the HSDPA call; and eliminate, by the serving wireless node, the SCH interference from the HSDPA call based at least in part on transmitting a signal for a particular high speed physical downlink shared channel (HSPDSCH) with the SCH interference removed from the signal to the UE.

23. The apparatus of claim 22, wherein the at least one processor is configured to eliminate the SCH interference on a first 16 HSPDSCH symbols.

24. The apparatus of claim 22, wherein the at least one processor is configured to calculate the SCH interference based at least in part on adding a primary synchronization channel amplitude multiplied with a primary synchronization code to a secondary synchronization channel amplitude multiplied with a secondary synchronization code.

25. The apparatus of claim 24, wherein the at least one processor is configured to calculate the SCH interference further based at least in part on multiplying a result of the adding with a conjugate of received pilot symbol times in a chip of a scrambling code corresponding to a slot position and an orthogonal variable spreading factor (OVSF) code of the HSDPA call.

26. The apparatus of claim 22, wherein a SCH signal related to the SCH interference is included in a system information block (SIB) received at the UE.

27. The apparatus of claim 26, wherein a master information block comprises scheduling information for the SIB.

28. The apparatus of claim 26, wherein the SIB comprises access stratum and non-access stratum information elements including one or more of a UE timer value, a reselection parameter, and a power offset.

29. The apparatus of claim 22, wherein the at least one processor is configured to sum the SCHIC algorithm over a first 16 HSPDSCH symbols.

30. The apparatus of claim 29, wherein the at least one processor is further configured to determine the SCH interference for the first 16 HSPDSCH symbols in the HSDPA call.

* * * * *